THREE-LINE CELL FOR RANDOM-ACCESS INTEGRATED CIRCUIT MEMORY

Filed Sept. 16, 1971

LESLIE L. VADASZ
JOEL A. KARP
INVENTORS

BY Spensley, Horn & Lubitz
ATTORNEYS

United States Patent Office 3,706,079
Patented Dec. 12, 1972

3,706,079

THREE-LINE CELL FOR RANDOM-ACCESS INTEGRATED CIRCUIT MEMORY

Leslie L. Vadasz, Sunnyvale, and Joel A. Karp, Cupertino, Calif., assignors to Intel Corporation, Mountain View, Calif.

Filed Sept. 16, 1971, Ser. No. 180,987
Int. Cl. G11c *11/24*
U.S. Cl. 340—173 CA 7 Claims

ABSTRACT OF THE DISCLOSURE

A three-line dynamic storage cell readily adaptable for use in a random-access integrated circuit memory which utilizes metal-oxide-semiconductor (MOS) devices or metal-insulated-semiconductor (MIS) devices is disclosed. The cell, which includes three field effect devices, utilizes the parasitic capacitance (associated with a lead coupling one field effect device with another device and the substrate supporting the cell) for storing an electrical charge. Three control lines are used with the cell for reading and writing information into and from the cell.

BACKGROUND OF THE INVENTION (1) Field of the invention

The invention relates to semiconductor memory cells.

(2) Prior art

The closest prior art known to the applicants' is a four line cell which utilizes three field effect devices. This cell is described in conjunction with FIG. 1 of this application. Additionally, the cell is described in the paper prepared for the 1970 IEEE International Solid State Circuits Conference entitled, "A Three-Transistor-Cell, 1024–Bit, 500–ns MOS RAM," Section IV (4.2) by W. M. Regitz and J. Karp. A memory array which utilizes this cell is discussed in IEEE Journal of Solid-State Circuits, vol. SC5, No. 5, October 1970, entitled "Three-Transistor Cell 1024–Bit 500–ns MOS RAM" by William M. Regitz and Joel A. Karp.

The memory cell disclosed herein requires three control lines instead of the four utilized in the prior art cell. By reducing the number of control lines used in a memory cell, reduction in the area required for fabricating a cell as an integrated circuit is achieved. The significance of such a reduction is higher circuit densities, increased yields and lower costs.

SUMMARY OF THE INVENTION

A three line memory cell which utilizes three field effect devices is disclosed. In the presently preferred embodiment, each of the devices comprises a field effect transistor each having a gate, and two other terminals commonly referred to as the source and drain terminals. These devices in the presently preferred embodiment, are N-channel MOS transistors which utilize a $P^+$ polycrystalline silicon gate. The first of these devices has its gate coupled to the first line, referred to as the X-line, and one of its other terminals coupled to the second line, hereinafter referred to as the Y-line. The other terminal of the first device is coupled to the gate terminal of the second device; the lead interconnecting these two terminals along with the substrate supporting the cell, forms a parasitic capacitor which is used to store a charge. One of the other terminals of the second device is coupled to the third line, hereinafter referred to as the Z-line, while the remaining terminal of the second device is coupled to one terminal of the third device. The gate of the third device is coupled to the X-line and the remaining terminal of the third device is coupled to the Y-line. By the application of voltages to the X, Y and Z lines a charge is stored on the parasitic capacitor and the presence or absence of the charge determines whether the cell is programmed with a "1" or a "0."

DETAILED DESCRIPTION OF THE INVENTION

In the present invention, a dynamic storage cell is disclosed wherein information is stored in the form of an electrical charge on a capacitor. The cell is adaptable for use with a memory array or circuit which has three separate control lines. The charge on the capacitor is transient and must be refreshed or recharged periodically. The refreshing or recharging is often done by utilizing a one bit shift register that continuously circulates on itself. For a description of one recirculation circuit, see "MOS Random-Access Arrays," Electronics, Jan. 20, 1969, by Burton B. Tunzi. In the present description, the refreshing or recharging cycle will not be discussed in detail. It will be obvious to one skilled in the art that when information is read from the cell herein described, it may be recirculated and rewritten into the cell in the manner described in the article or by other known techniques.

The random-access integrated circuit memory cells described herein may utilize metal-insulated-semiconductor (MIS) or metal-oxide-semiconductor (MOS) devices, commonly known and utilized in the art. The surface field effect transistors (FET) are particularly adaptable for use in the cell herein described. For a comprehensive description of these devices, see Chapter II Physics and Technology of Semiconductor Devices, A. S. Grove, published by Wiley in 1967. These devices are typically produced on either an N-type or P-type silicon substrate and each has a gate, drain and source electrode or terminal. In most MOS devices, the source and drain electrodes or terminals are interchangeable and will be assumed to be so for this application. The field effect devices utilized in the present invention may have aluminum gates or may utilize other metals or silicon. For a general discussion on silicon-gate technology, see IEEE Spectrum, October 1969, pages 21–35. In the presently preferred embodiment of the present invention, N-channel enhancement mode MOS–FET devices produced on a P-type silicon substrate are utilized. These devices use a polycrystalline silicon gate.

Figure 1:
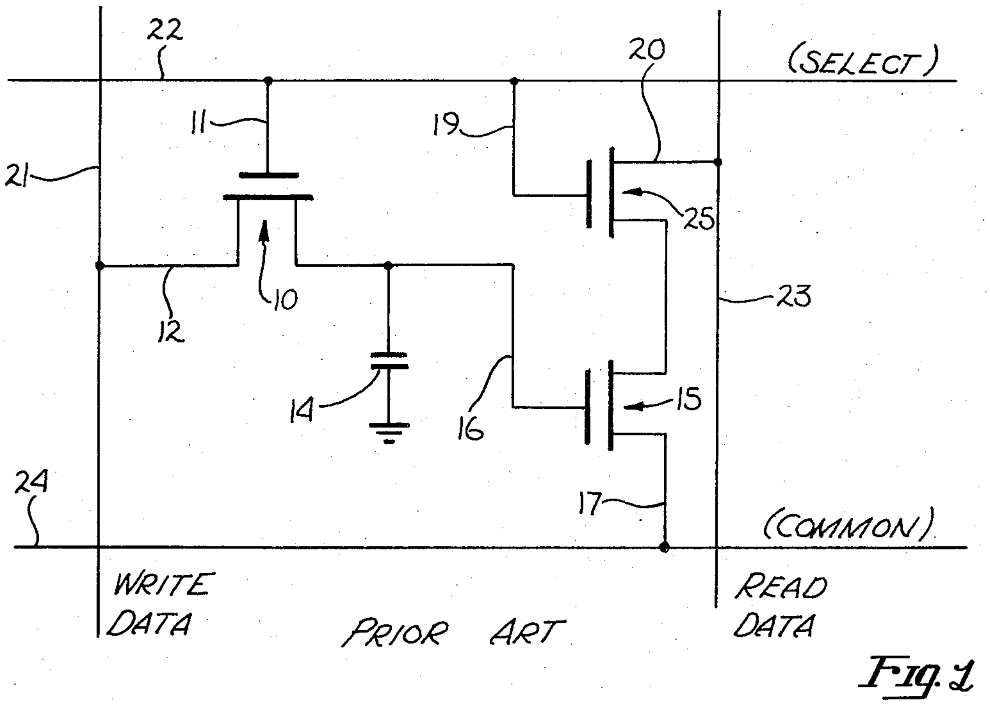
FIG. 1 is a prior art cell which utilizes four lines and three field effect devices.

Referring to FIG. 1, a prior art four line memory cell which utilizes capacitance storage is illustrated. The cell is adaptable for use in a random-access memory circuit or array where the cell is coupled to a select line 22, write data line 21, read data line 23 and a common line 24 of the memory array. In the circuit of FIG. 1, an input gating field effect device 10 has its gate 11 coupled to line 22 and one of the other two terminals coupled to line 21. The other one of its other two terminals is coupled to capacitor 14 and gate 16 of the field effect device 15. Device 15 has one of its other terminals 17 coupled to line 24 and the other one of its other two terminals coupled to field effect device 25. Device 25 has its gate 19 coupled to line 22 and one of its other terminals 20 coupled to line 23. The capacitor 14 is typically the parasitic capacitance associated with the lead coupling devices 10 and 15 and the substrate supporting the cell.

In order to write information into the cell of FIG. 1, a signal is applied to line 22, causing device 10 to conduct. This allows a bit of information, if one is applied to line 21, to flow from line 21 onto capacitor 14 where the information is stored in the form of a charge on capacitor 14. During the read cycle, line 23 is typically precharged to a predetermined level as in the write data line 21. (The precharging of the read data and write data lines may be done utilizing techniques and circuits commonly known and used in the art.) A signal is applied to line 22, causing device 25 to conduct, thereby discharging line 23 via line 24 which is grounded if device 15 is conducting. Device 15 will be conducting if a charge has previously been stored on capacitor 14.

In utilizing the cell of FIG. 1 the amplitude of the signal applied to line 22, during the read cycle, must be carefully controlled since if too large a voltage is applied to this line it will cause device 10 to readily conduct, thereby allowing excessive charge to be stored on capacitor 14. In application Ser. No. 19,322, filed Mar. 13, 1970, four line memory cells which each utilize three MOS devices are disclosed, which do not require the careful control of the voltage applied to the control lines of the array during the read cycle.

The presently invented memory cell also requires, during the read cycle, the use of a carefully controlled signal, which must be controlled in a similar fashion to the signal applied to line 22 of the cell of FIG. 1. But, the presently disclosed memory cell has the distinct advantage over the prior art cells of only requiring three separate control lines. In practice it has been found that the memory cell of FIG. 1 requires between three to six sq. mils for each cell when the cells are fabricated as an integrated circuit. With the presently disclosed cell, since one of the control lines has been eliminated, memory cells may be fabricated which require only 1.5 to 2.5 sq. mils per cell. This reduction in area perimts the fabrication of a memory array having a greater density (bits/area) than was possible with the prior art cells. Since typically, during the fabrication of MOS integrated circuits, the yield does not decrease as the circuit density increases, memory arrays fabricated utilizing the presently disclosed cells, may be fabricated at a lower cost than those using the prior art cells.

Figure 2:
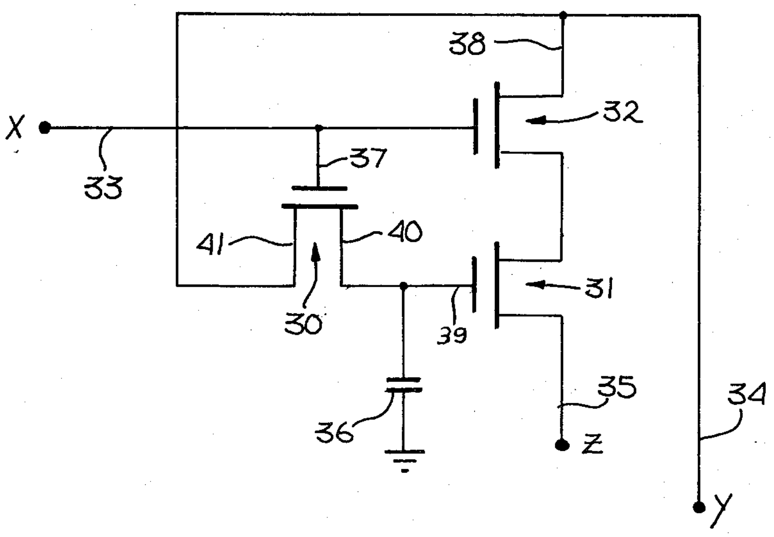
FIG. 2 is a memory cell built in accordance with the present invention which utilizes three control lines and three field effect devices.

Referring to FIG. 2, the presently preferred embodiment of the memory cell is disclosed which includes a first, second and third control line. These control lines are hereinafter referred to as the X-line, line 33, the Y-line, line 34, and the Z-line, line 35. The first field effect device 30 has its gate 37 coupled to the X-line, its source terminal 41 coupled to the Y-line and its drain terminal 40 coupled to capacitance means 36. The second field effect device 31 has its gate 39 coupled to the capacitance means 36 and its source terminal coupled to the Z-line. The third field effect device 32 has its gate coupled to the X-line, its source terminal coupled to the drain terminal of device 31 and its drain terminal 38 coupled to the Y-line. As previously mentioned, the three field effect devices 30, 31 and 32 in the presently preferred embodiment, each comprise MOS–FET N-channel devices fabricated on a P-type silicon substrate and include $P^+$ polycrystalline silicon gates. While the cell may be also fabricated, utilizing P-channel devices, it has been found that better electrical performance is achievable with the N-channel devices. The field effect devices 30, 31, 32 and their interconnections may be fabricated utilizing known MOS technology.

Capacitance means 36, in the presently preferred embodiment, is the parasitic capacitance between the lead coupling the gate 39 of device 31 with the drain 40 of device 30 and the substrate supporting the cell. It is readily apparent that a plurality of cells, such as the one illustrated in FIG. 2, may be fabricated on a single substrate to form a random-access memory array. The decoding and refreshing circuitry associated with such a memory array may be built utilizing the techniques discussed in IEEE Journal of Solid-State Circuits, vol. SC5, No. 5, October 1970, entitled "Three-Transistor Cell 1024-Bit 500-ns MOS RAM."

To write or store information in the cell of FIG. 2, the data to be stored is placed on the Y-line, line 34, in the form of a positive voltage. Additionally, during the write cycle a positive voltage of sufficient magnitude to cause device 30 to fully conduct is applied to the X-line, line 33. During the write cycle, the Z-line, line 35, is allowed to electrically float. When this occurs an electrical current will flow through device 30 and positively charge capacitance means 36.

To read information from the cell of FIG. 2, the Z-line is grounded while the Y-line is precharged positively. A positive voltage is applied to the X-line, line 33. The magnitude of this voltage should not be large enough to cause device 30 to freely conduct but rather only large enough to cause device 30 to partly conduct. If a charge has previously been stored on capacitor means 36, device 31 will conduct. Since the positive voltage applied to the X-line is also applied to the gate of device 32, device 32 will also conduct, causing the Y-line to approach ground potential since a current path exists through devices 32 and 31 to ground. If no charge has been previously stored on capacitance means 36, device 31 will not conduct and the charge placed on the Y-line will remain thereon.

Note that during the read cycle, when a charge has been previously stored on capacitance means 36, an undesirable current path exists from that capacitor to ground through devices 30, 32 and 31. If the read cycle is prolonged or if device 30 is allowed to conduct too freely the charge stored on capacitor 36 will be lost through the Z-line. If this occurs device 31 will be turned off, possibly before the charge is removed from the Y-line, thereby giving a false reading. In order to prevent this from happening, the voltage applied to the X-line must be sufficiently controlled to only cause device 30 to partly conduct. Note that this same voltage is also applied to the gate of device 32. Since the source of device 32 is grounded for the described situation, device 32 will more readily conduct than device 30 even though the same voltage is applied to the gates of both devices. Thus, it is possible to read information from the cell even though a portion of the charge on capacitor 36 is being lost during the read cycle.

In the presently preferred embodiments the Z-line, line 35, is left floating during the write cycle and is grounded during the read cycle. It may be possible in other embodiments of the present invention to have the Z-line grounded during both the read and write cycles.

It will be obvious to one skilled in the art that if P-channel field effect devices are utilized in lieu of the N-channel devices discussed in conjunction with FIG. 2, that negative voltages, instead of positive voltages, will be utilized during the read and write cycles.

Thus, a random-access memory cell comprising an integrated circuit which utilizes MOS devices has been disclosed. The cell requires only three separate control lines, thereby permitting a cell to be fabricated in a smaller area than was possible with the prior art four line cells.

We claim:

1. A cell for a random-access integrated circuit memory which utilizes at least a separate first, second and third control line comprising:

capacitance means for storing an electrical charge;

a first field effect device having a gate and at least two other terminals, one of said other terminals being coupled to said capacitance means, the remaining of said other terminals being coupled to said second line and said gate being coupled to said first line;

a second field effect device having a gate and at least two other terminals, one of said other terminals being coupled to said third line and said gate being coupled to said capacitance means; and a third field effect device having a gate and at least two other terminals, said gate being coupled to said first line, one of said other terminals being coupled to the remaining of said other terminals of said second field effect device, and the remaining terminal of said other terminals being coupled to said second line;

whereby a bit of information may be selectively stored or written onto said capacitance means and selectively read from said capacitance means.

2. The cell defined by claim 1 wherein said capacitance means comprises parasitic capacitance.

3. The cell defined by claim 2 wherein said parasitic capacitance comprises the capacitance between a lead coupling said one of said other terminals of said first field effect device with said gate of said second field effect device, and a substrate supporting the cell.

4. The cell defined by claim 2 wherein said first, second and third field effect devices each comprises an MOS device.

5. A cell defined by claim 4 wherein said first, second and third field effect devices are N-channel devices.

6. The cell defined by claim 5 wherein said gates of said first, second and third field effect devices comprise silicon.

7. The cell defined by claim 3 wherein each of said first, second and third field effect devices comprises an N-channel MOS field effect transistor having a silicon gate.

References Cited

UNITED STATES PATENTS 3,506,851 4/1970 Polkinghorn -------- 340—173

TERRELL W. FEARS, Primary Examiner

U.S. Cl. X.R.

307—238, 279; 340—173 R